US005990908A

United States Patent [19]
Thingvold

[11] Patent Number: 5,990,908
[45] Date of Patent: Nov. 23, 1999

[54] METHOD AND APPARATUS FOR PROCESSING FULL MOTION COMPUTER ANIMATION

[75] Inventor: Jeffrey Allyn Thingvold, Shoreview, Minn.

[73] Assignee: Lamb & Company, Minnesota, Minn.

[21] Appl. No.: 08/934,526

[22] Filed: Sep. 22, 1997

[51] Int. Cl.$^6$ .................................................. G06T 17/70
[52] U.S. Cl. ........................................... 345/474; 345/474
[58] Field of Search ....................................... 345/474, 473

[56] References Cited

U.S. PATENT DOCUMENTS

| | | | |
|---|---|---|---|
| 5,214,758 | 5/1993 | Ohba et al. | 345/473 |
| 5,767,861 | 6/1998 | Kimura | 345/474 |
| 5,877,778 | 5/1999 | Dow et al. | 345/473 |

Primary Examiner—Mark R. Powell
Assistant Examiner—Hue Dung X. Cao
Attorney, Agent, or Firm—Schwegman, Lundberg, Woessner & Kluth PA

[57] ABSTRACT

A system for applying motion capture data to a character motion hierarchy provides a more accurate motion representation. The position of certain nodes in a motion hierarchy are modified to allow application of motion data to a character having a different physiology than that of the motion capture subject. The present invention provides the ability to modify the angular information of individual motion hierarchy nodes and segments based on translational information associated with the source hierarchy. This provides a continuity of motion in the resulting motion representation that is not available with conventional motion processing methods.

7 Claims, 3 Drawing Sheets

METHOD AND APPARATUS FOR PROCESSING FULL MOTION COMPUTER ANIMATION

FIELD OF THE INVENTION

The present invention relates in general to methods and apparatus for computerized motion simulations, and particularly to flexibly associating motion data with a variety of skeletons.

BACKGROUND OF THE INVENTION

A character's motility is proscribed according to the geometry represented by the character's skeleton, which comprises a set of nodes and their interrelationships referred to as 'segments'). A skeleton, whether it be associated with character motion or motion capture, can be thought of in one respect as a hierarchy, with a single root node to which the remaining nodes are related. A character is designed around a motion hierarchy which is developed in such a way as to best represent the character's structure and range of motion. In the same way, a hierarchy of inter-related nodes is implied in motion capture data (and generally correlates to the placement of the sensors). In one embodiment of the present invention, each individual segment of the respective hierarchies exists in a local coordinate system which is oriented to that segment and its associated node.

To represent the character as a single entity the position and alignment of each segment of the character's motion hierarchy (and the motion capture hierarchy) must be oriented to a single global coordinate system. This can be accomplished in several ways. One is to align each node's local coordinate system directly with the global coordinate system. This method, however, masks the interrelationship of the segments. A second method is to orient a single central segment, the root of the hierarchy, to the global coordinate system and then correlate the remaining segments in parent-child pairs by associating each segment (child) with the adjoining segment on the rootward end (parent). Segments are associated by aligning the local coordinate system of the child segment with the local coordinate system of the respective parent segment.

One method of using motion capture data to give motion to a character consists of transforming the motion capture hierarchy to align with the character's motion hierarchy, thereby transforming the motion data to apply to the character. A transformation is a mathematical description of this alignment of coordinate systems. Each node of the character motion hierarchy tree represents a transformation from the local coordinate system of one segment to the local coordinate system of the adjacent segment. A transformation is defined in terms of adjustments to rotation, translation, and scaling characteristics. Each transformation occurs in its own reference frame or context. A transformation is "local" when its reference frame is relative to the transformation of its parent node. A "global" transformation is one where its reference frame is relative to the world coordinate system. When the second method of node alignment described above is used, inner nodes of the character motion hierarchy are thus local transformations when considered individually. The root of the hierarchy is always global because it has no parent. The root node anchors the character in terms of the world coordinate system. A global position can be determined for any given node by concatenating the local transformation of that node with the local transformation of its parent, then concatenating the result with the local transformation of its parent's parent, and so on, until the root node is reached and its transformation (which is always global by definition) is concatenated.

Motion data by definition includes an inherent structure or skeleton. In order to emulate motion in a simple one-object system, the object's skeleton is defined in terms of the interrelationships of a collection of nodes. FIG. 1 shows a simple object skeleton consisting of nodes 101–110. For each point in time, each node has an (x,y,z) position and associated segment information. In some systems the (x,y,z) positions are absolute positions in a universal coordinate system 150. In other systems the skeleton is set up as a tree-like structure, with a single root node (101 in the example shown) positioned in a universal coordinate system. The locations of the remaining nodes 102–110 are offsets measured from the node next closer to the root node on that particular branch of the tree. This is also described as a parent-child relationship. For example, for one of the legs of the skeleton shown in FIG. 1, in a first-level parent-child association the position of node 102 (the child) is defined in terms of root node 101 (the parent). In a like manner, a second level parent-child relationship exists where the position of node 103 (the child) is defined in terms of node 102 (a parent in this relationship).

A character defined in this manner is made to "move" by changing the relationships between some or all of the nodes for each of a series of time slices. At each point in time (time slice), then, the position (or "translation") of any one node (the child node) may be described in terms of the translation of the node next closest to the root node (the parent node) and the node's rotation and scale relative to the parent. "Translation" identifies the node's position in an (x, y, z) coordinate system. "Rotation" refers to radial motion about a central point. Rotation data identifies the child node's alignment within a stated coordinate system at a particular point in time, the parent node serving as the rotation point. "Scale" refers to the spatial relationship between the two nodes. A change in any one or more of these aspects from one time slice to the next is what brings the perception of motion to the skeleton. Motion data can thus be described numerically as a succession of changes in the translation, rotation and scale of a set of nodes.

Data for giving motion to a character is derived in a number of ways. It may be manufactured by hand, but this is a very tedious process and is generally used for only the most simple of motions. One common method, referred to as motion capture, is to affix sensors at node locations of a movable object (such as a person) and then "capture" the motion by recording the change in sensor positions in fixed increments of time as the motion capture subject emulates the motions which the character is to embody. If the character to which the motion data is to be applied (the 'target') is based on a skeleton (the entire framework of nodes and segments) which is physiologically identical to the motion capture skeleton (the 'source') the motion data can be applied to the character more or less directly by aligning the source skeleton nodes to the corresponding target skeleton nodes with little or no transformation required.

However, where the character is based on a skeleton which only approximates the source skeleton or which has significant variances from the source skeleton, further transformation of the motion data must be performed in order to effectively assign the captured motion data to the character. One method of transforming motion capture data between disparate skeletons is described in U.S. patent application Ser. No. 08/678,670, filed Jul. 11, 1996 the entire contents of which are incorporated herein by reference. According to this method, the root node of the target skeleton is aligned with the root node of the source skeleton. All elemental position changes are then described in terms of the root node. The other nodes of either skeleton branch out from the root in a tree-like fashion. The motion for each node is defined in terms of its relationship ("child") to the next node in the direction of the root ("parent"). This method allows scaling and other techniques to be applied to any child node, thus enabling transfer of motion from one skeleton to another skeleton with different segment dimensions.

While this technique resolves some of the issues surrounding the ability to maintain the proper relationship between adjoining segments, limitations remain in conventional motion data processing techniques. One limitation is that conventional systems are ill-equipped to handle target skeletons which contain one or more segments which differ significantly from those of the source system. One example would be where the leg segments of the source system are essentially equal in length, while in the target system the upper leg length is significantly shorter than the lower leg length. FIG. 2A shows the position of the foot node 105 of the source skeleton as the lower leg moves through a sequence of angles. FIG. 2B shows how a conventional transformation of the motion data to a leg of different proportions would result in the leg segment 205 no longer attaching to the foot node 105.

A process referred to as "inverse kinematics" (IK) is one partial solution that has been developed in an attempt to address the problem of matching the motion and placement of nodes(such as end effectors) with their associated segments when the target skeleton differs physiologically from the source skeleton. IK reconstructs segment motion according to modifying the angular characteristics of a node using mathematical estimation.

There are, however, limitations in this solution. At a basic level, IK allows the user to identify a best fit for a segment at each time slice. Conventional IK, however, starts with the segment position and then recalculates the associated angles according to established mathematical models. Since there are an infinite number of solutions possible for any give point in time, it becomes a trial-and-error process to find the appropriate value for each time slice. In addition, the angles for each succeeding point in time are independently derived. As a result discontinuities are introduced into the motion representation. What is needed is a way to transfer motion data between dissimilar structures without introducing inconsistencies into the resulting motion of the target structure. In addition, there is a need to apply adjustments to the motion capture data in such a way as to make the resulting data available to a wide range of motion-oriented applications, as conventional animation systems tends to perform IK differently and generally incompatibly.

SUMMARY OF THE INVENTION

The present invention is a method and apparatus for applying motion capture data to a hierarchy which is different than the hierarchy inherent in the motion capture data. According to one embodiment a computer program for processing motion data comprises instructions for reading a character motion hierarchy consisting of a plurality of nodes, instructions for reading motion capture data having a hierarchy consisting of a plurality of sensor positions, instructions for applying the motion capture data to the character motion hierarchy, and instructions for modifying the motion data assigned to a first one of a plurality of nodes incorporated in the character motion hierarchy.

In one embodiment the instructions for modifying the motion data assigned to a first node of the plurality of nodes comprise identifying the translational position of the one or more of the plurality of remaining nodes which are related to the first node, identifying a relationship between the first node and each of the one or more related nodes, and using the first node's translational and rotational position as discriminators, determining a modified translational and rotational position for the first node such that the relationship of the first node between each of the one or more related nodes is satisfied.

In another embodiment of the present invention a method for processing motion data comprises the steps of creating a character motion hierarchy consisting of a first framework of a plurality of nodes, generating motion data, assigning the motion data to the character motion hierarchy, and for a first node of the plurality of nodes, modifying time-based translational data assigned to the first node. According to one implementation the motion data has an associated motion capture hierarchy which consists of a second framework of a plurality of sensor positions, wherein the motion data consists of time-based translation data for each of the plurality of sensor positions. In another embodiment the step of assigning the motion data to the character motion hierarchy consists of, for each one of the plurality of nodes, assigning the time-based translation data for one of the plurality of sensor positions.

In one embodiment the step of modifying time-based translational data comprises modifying the time-based translational data assigned to a first node according to any segments associated with the first node, the first node's relationship to one or more of the remaining plurality of nodes, and the first node's angular relation to the coordinate system. In yet another embodiment the step of modifying the time-based translational data comprises replacing the time-based translational data with data derived from the time-based translation data of the one or more nodes related to the first node. According to another embodiment the step of modifying the time-based translational data comprises modifying the time-based translational data according to the data derived from the time-based translation data of the one or more nodes related to the first node.

DETAILED DESCRIPTION OF THE PREFERRED EMBODIMENTS

Figure 1:
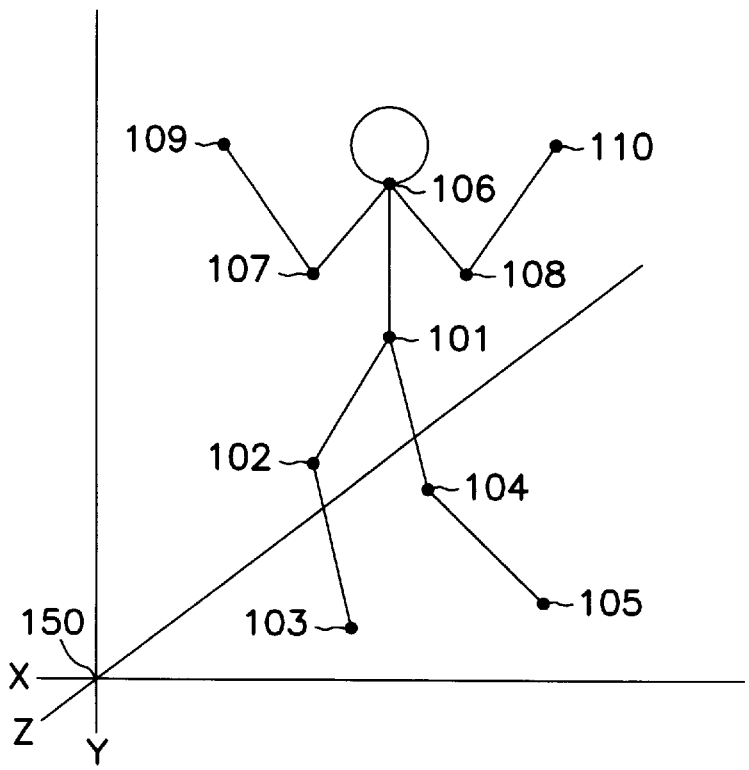
FIG. 1 is a schematic diagram illustrating a simple object skeleton as described in one embodiment of the present invention.
Figure 2A:
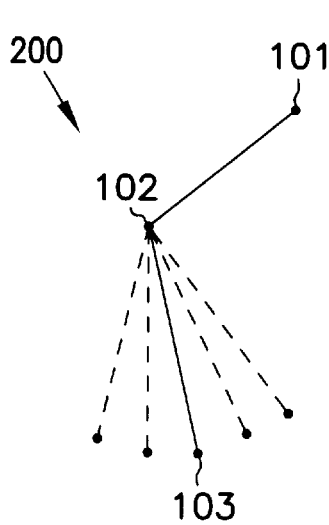
FIG. 2A is a schematic drawing representing the change in position of a character's foot when the leg of a given length is moved through a series of angles.
Figure 2B:
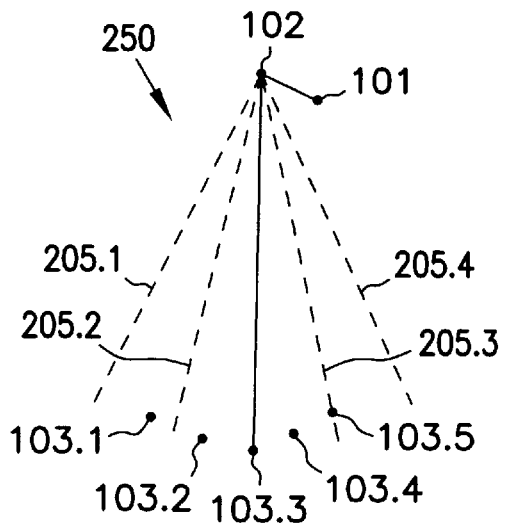
FIG. 2B is a schematic drawing comparing the change in foot position shown in FIG. 2A to the change in foot position of when a character having longer leg than that shown in FIG. 2A move the leg through the same series of angles as the leg in FIG. 2A.

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present invention. The following detailed description is, therefore, not to be taken in a limiting sense, and the scope of the present invention is defined by the appended claims.

The below described system of the invention executes in a computer environment which supports graphics processing. One example of such an environment is a Silicon Graphics® Inc. workstation such as an Indigo Extreme™. A preferred configuration includes 32 Mbytes of main memory and a 100 MHz processor. The system also includes a monitor which supports graphic displays. Version 5.2 of the IRIX™ is the preferred operating system. Those skilled in the art will recognize, however, that other comparable hardware and operating systems may be employed without diverting from the spirit or scope of the present invention.

The system of the present invention uses translation data to generate rotation data as an improvement over the conventional method of iteratively estimating translation data modifications in order to accommodate variances in segment dimensions between source and target hierarchies. In one embodiment of the present invention, motion capture data is used both to determine where a segment should be positioned (using techniques similar to IK) and to provide an initial guess for the appropriate rotation (using captured rotation data as a discriminator). This takes maximum advantage of the motion capture data, and it gives better continuity of motion than conventional IK techniques. The system of the invention is able to do this because the "motion engine" interfaces to any device which generates motion capture data (whether it be raw data from a physical device, data from a data file, or generated motion data such as that created using IK techniques). The motion engine is a key piece in that it coordinates input from independent sources. It incorporates a protocol to which many different devices/data source can adhere. The net result is "pure" animation data—there are no constraints related to the source. An additional benefit is that the user is able to access the motion data directly and "tweak" individual data values for fine-tuning the motion.

According to one aspect of the present invention, a user has the ability to transfer motion data from any one skeleton to any other skeleton. According to one embodiment of the present invention, the root node of the target skeleton is aligned with the root node of the source system, and the elemental position changes are applied to the target root node in the context of a global coordinate system. Next, each node in the target skeleton is aligned with a corresponding node in the source skeleton. For each source node-target node pair, the target node is assigned an angular relationship to the target's root node equivalent to the source node's angular relationship to the source's root node. Note that the source skeleton may have more or less nodes than the target skeleton.

Figure 3:
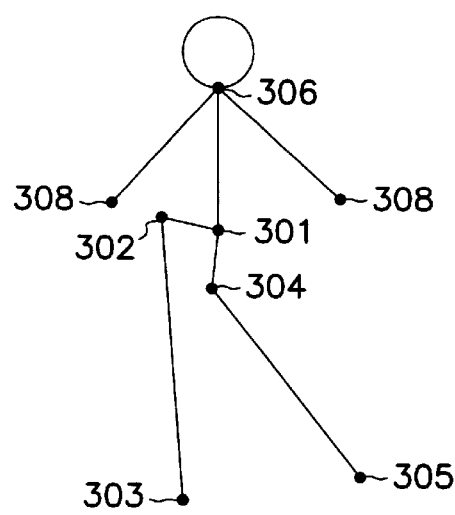
FIG. 3 shows a schematic drawing of a skeleton representing an avian figure according to one embodiment of the present invention.

As described above, conventional systems cannot easily transform motion data having a particular structure to a target skeleton having a different physiology. As an example, motion data is captured using a human figure as shown in FIG. 1, and the captured motion is to transformed to the computer-generated figure of a bird shown in FIG. 3. As can be seen, the source and target skeletons have significantly different leg structures. Those skilled in the art will recognize that the motion data for nodes 101, 106–108 is easily transformed to the respective nodes 301, 306–308. Motion data for nodes 109 and 110 can be disregarded as there are no corresponding target nodes. Transforming the motion data for nodes 102–105 to nodes 302–305 respectively will, without additional processing, result in incorrectly associated segments.

Conventional systems employ a process referred to as inverse kinematics (IK) to calculate the locations for one or more nodes in order to provide a best fit representation of the segments connecting the nodes. Conventional IK techniques generally add a significant amount of processing time and introduce additional inconsistencies into the motion data. Simply described, conventional IK starts at a known point and estimates a position for the first intermediate node based on known translational information (such as the length of the interconnecting segment). It then follows the same process, starting from the first intermediate node and estimating the position of the next node. This is done until the position of the final node in the chain is estimated. The entire process is reiterated until an acceptable solution is derived.

Figure 4:
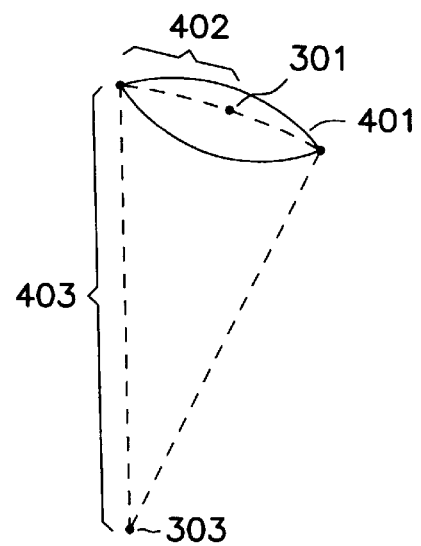
FIG. 4 is a graphic representation of the possible solutions for connecting two nodes of known position through a third point about which all is known is its distance from each of the other nodes.

One skilled in the art will recognize that the results can be inconsistent from frame to frame, resulting in discontinuities in the represented motion. This is due in part to the fact that there are an infinite number of solutions available for each segment. FIG. 4 is a graphic representation of the possible solutions for connecting two nodes 301, 303 through a third point about which all is known is its distance 402, 403 from node 301 and node 303 respectively. As shown in FIG. 4, there are an infinite number of solutions available at node 302 as represented by the "circle of solution" 401. From a strictly mathematical point of view, node 302 could fall anywhere on circle 401 and be correct. Conventional IK applies an iterative process to systematically reduce the number of results down to a best fit selection. Since conventional IK calculates the a best-fit solution for each time slice independently, however, there is no guarantee that the solution for consecutive time slices will be consistent at either intermediate node 302 or end effector 303. As a result, when the motion sequence is displayed the viewer will see discontinuities in the motion.

In contrast, one embodiment of the system of the invention provides a novel method of more efficiently and accurately determining the position of an intermediate node. Instead of transforming all non-root nodes in terms of their parent node, certain nodes are transformed in terms of the same global coordinate system to which the root node is referenced. This ensures that the proper spatial relationship between those nodes and the root is retained. Conventional systems do not include a facility for relating nodes transformed in terms of the global coordinate system, treating them as independent objects. The system of the invention, however, includes the ability to associate such nodes using 'PointAt' logic which is an improvement over conventional IK methods.

In one example of a process implementing the system of the present invention, including the PointAt logic, root node 101 is transformed in terms of the global coordinate system and nodes 106–108 are transformed in relation to root node 101. Both node 103 and 105 are also transformed in terms the majority of the target skeleton nodes are transformed skeleton the transformation from source node 103 to target node 303 is performed using the global coordinate system instead of referencing the parent nodes 102, 302. As a result the position of end-effector 303 with respect to the root node 301 is known and does not have to be interpolated. This prevents the introduction of motion inconsistencies resulting from different solutions arrived at by the transformation algorithm, in addition to solving the problem of 'sliding' and 'skating' addressed by conventional IK systems.

Figure 5:
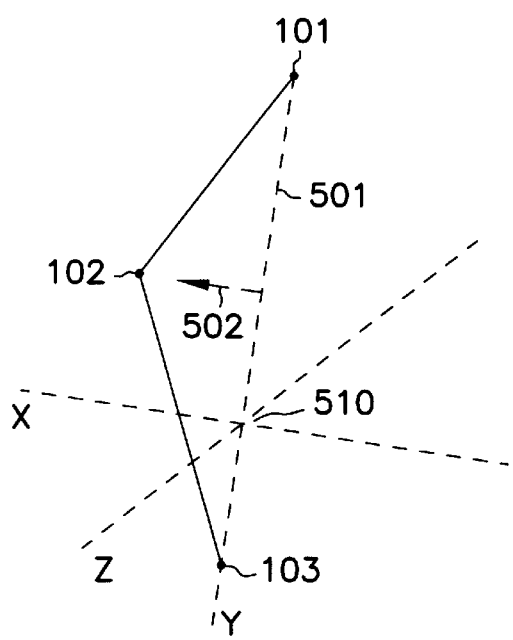
FIG. 5 is an enlarged view of the leg portion of the source skeleton shown in FIG. 3.
Figure 6:
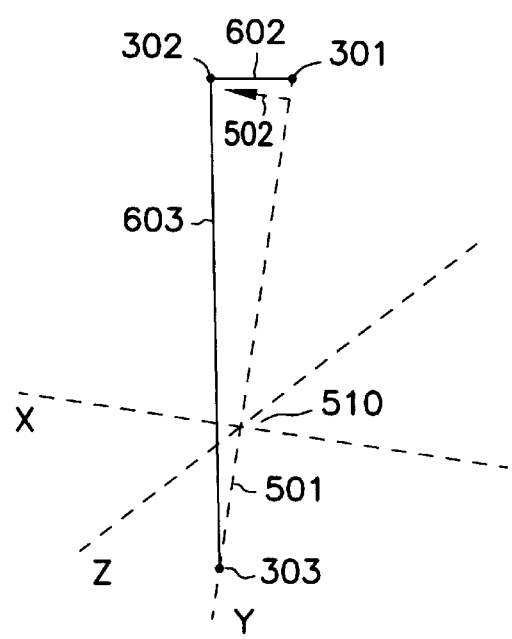
FIG. 6 is an enlarged view of the leg portion of the target skeleton shown in FIG. 3.
Figure 7:
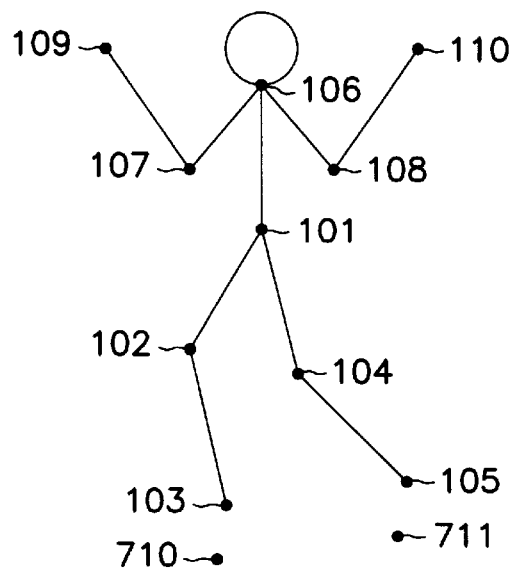
FIG. 7 illustrates the position of motion capture nodes when the motion capture hierarchy is scaled too big according to one embodiment of the present invention.

Next, a line 401 (FIG. 4) representing the Y-scale of a coordinate system 510 is drawn between the neighboring nodes 101, 103 of the source skeleton. FIG. 5 is an enlarged view of the leg portion of the source skeleton shown in FIG. 1, and FIG. 6 is an enlarged view of the leg portion of the target skeleton shown in FIG. 3. As shown in FIG. 5, a vector 502 indicating the X and Z direction the intermediate node varies from the line 501 is then determined. In the target skeleton (FIG. 7) the position of the neighboring nodes 301, 303 is known. As show in FIG. 6, line 501 representing the Y-scale of the coordinate system 510 is drawn between these two nodes, and then the vector 502 is positioned in the coordinate system 510. The position of intermediate node 302 in the plane of the vector is then determined using the known distances from node 301 and 303. By interpolating the position of the intermediate node 302 using the lengths of the leg segments 602, 603 and the direction vector the process is more efficient and the result is more accurate.

The method of the present invention is more efficient than conventional IK methods because it uses the armature of the motion capture skeleton to limit the number of possible solutions when a segment's motion is being interpolated. This reduces processing time by reducing the number of possible solutions which have to be evaluated. In addition, the end result is much closer to a direct offset than that achieved through conventional IK techniques because it interpolates a segment's motion in terms of the motion of the segments to which it is related.

According to another embodiment of the present invention the PointAt logic provides the ability to determine a segment's rotation at a given point in time. For end effectors or other segments which cannot be transferred directly due to skeleton variations between source and target or other reasons, the initial position of the end effector is determined and then both a delta rotation and a delta translation are applied. There is a set of rules employed by the PointAt logic which, among other things, provides controls for a segment's axial location (for example "line up with parent", etc.).

Motion data is then collected using any of the well-known motion capture methods. Once the data is in the system pointers are set up by identifying, for each pointer object, what the object points from and what it points toward. A pointer object takes the place of, in one embodiment, the segment between a node connected to the skeleton and an associated node which relates to the first node differently than the respective associated source nodes. One example is a pointer object pointing from a foot node to a toes node, where the distance between the two nodes is different than that between the respective foot node and toes node of the source motion capture data hierarchy.

Figure 8:
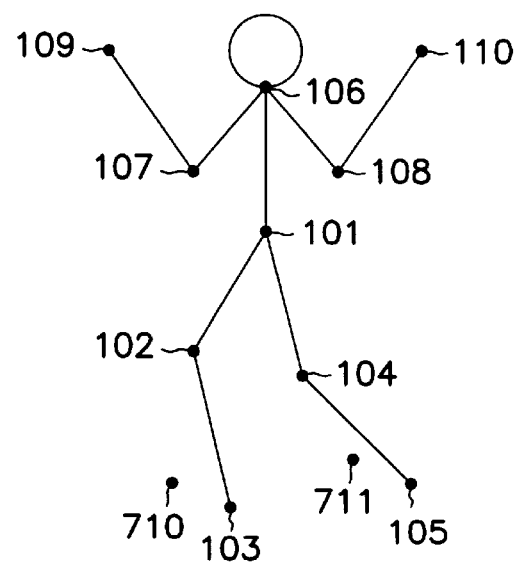
FIG. 8 illustrates the position of motion capture nodes when the motion capture hierarchy is scaled too small according to one embodiment of the present invention.

Once these relationships have been defined, in one embodiment the resulting motion capture skeleton is scaled to approximate the size of the character motion hierarchy. In the example shown in FIG. 7 a scale of 1.23 is too tall. The toes 710, 711 do not get close enough to the end of the lower legs 103, 105. In the same way a scale of 1.0 is too short (FIG. 8) in that the legs must always be bent and the feet will never point lower than level. According to one embodiment of the present invention the scale factor may not be the same for the entire body. For example, there may be one scale factor for the legs and another for the upper body and arms. In the case where two scale factors are needed, the two areas are scaled and recorded into the database independently. The two areas should be processed with at least one node in common, however, to ensure consistency in global positioning. From that point on, when the entire figure is display the respective scale factors are applied to the appropriate areas.

Once a satisfactory scale is determined, any pointers which have associated motion capture data are calibrated (both the translational and rotational offsets) in order to align the captured information with the target skeleton. Scaling and calibrating tasks may be done in any order. According to one embodiment of the present invention the motion data is processed iteratively in order to achieve a more satisfactory result. In one implementation the "floor" of the scene is translated into position to serve as a calibration reference.

At this point, if the entire animation is displayed it will be seen that, even if the scale looks correct, the distance between the ends of the arms and legs and the position of the hands and toes does not remain constant. According to one embodiment of the present invention, there are two ways to lock the hands and feet to the ends of their respective limbs. One way is to pull each appendage to sit at the end of the respective limb using a construct referred to as the "hold distance". The appendage will now stay attached to the end of the limb throughout the limb's range of motion because the motion is defined in terms of the end of the motion hierarchy limb instead of being a transformation of the motion capture data for the associated appendage node of motion capture hierarchy. In the case where the appendage comprises more than one node (such as a foot consisting of a foot node and a toes node) the appendage does not remain stationary. In the example of a two-node foot appendage, this means the toes move around with the foot, causing the foot to appear to slide around on the floor. Thus this technique is better used on appendages which do not have to remain in contact with a particular spot.

When this method is used, the lower limbs are converted to pointer objects, each pointing at the respective appendage object. In the case where the lower limbs' motion was originally collected (rather than derived), the original lower limb motion data is overwritten by the data reflecting each limb's pointing at the respective appendage.

Figure 9:
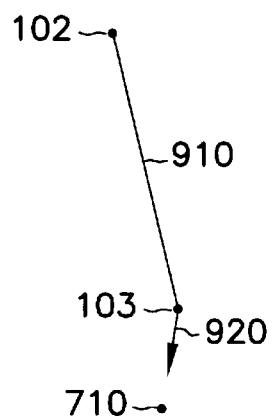
FIG. 9 illustrates the use of a single pointer according to one embodiment of the present invention.
Figure 10:
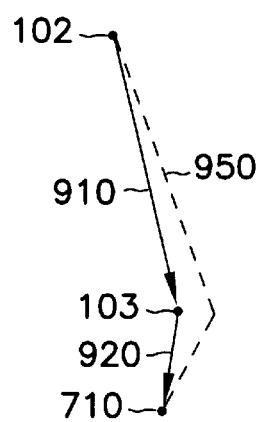
FIG. 10 illustrates the use of a dual pointer according to one embodiment of the present invention.

A second method provided by the present invention for locking end effectors onto their associated limbs is referred to as a "dual pointer" method. According to one embodiment, a dual pointer is the first of two pointers in a hierarchical row. One example, using the lower leg 102, foot 103 and toe 710, is illustrated in FIGS. 9 and 10. As can be seen in FIG. 9, if the foot 920 is the only pointer object and the lower leg segment 910 follows the motion capture data, in the range of motion represented by the scene the foot object 920 does not always reach the toe 710. One way to ensure the foot's being able to always reach the toe, illustrated in FIG. 10, is to allow the lower leg segment 910 to adjust it's rotation. In this embodiment of the present invention the lower leg segment 910 is converted to a dual pointer object. As such it uses the collected motion data as the starting point for its position and orientation (represented by line 950), and then modifications are applied by the system of the invention to help the foot object 920 reach the toe 710. Because the collected motion data associated with the lower leg object 910 is merely amended and not replaced, characteristics such as the amount of twist are retained. As the second pointer in the chain, the foot object 920 does not use any of the collected motion data, just as it would not if it were the only pointer in the chain. As a result, toes 710 are always accurately positioned, and the position of foot 103 is adjusted to ensure that the segments between it 103, lower leg 102 and foot 710 are always properly attached through the full range of the character's motion.

It can therefore be seen that the various embodiments of the present invention provide the ability to modify the angular information of individual motion hierarchy nodes and segments based on translational information associated with the source hierarchy. This provides a continuity of motion in the resulting motion representation that is not available with conventional IK methods.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A computer program for processing motion data, comprising:
    instructions for reading a character motion hierarchy consisting of a plurality of nodes, wherein each of the plurality of nodes is related to one ore more of the remaining plurality of nodes;
    instructions for reading motion capture data having a hierarchy consisting of a plurality of sensor positions;
    instructions for applying the motion capture data to the character motion hierarchy, wherein each one of a subset of the plurality of nodes is assigned the motion data associated with one of the plurality of sensor positions; and
    instructions for modifying the motion data assigned to a first one of the plurality of nodes, including:
        logic to identify the translational position of each one of the plurality nodes which are related to the first node;
        logic to identify the a relationship between the first node and each one of the plurality nodes related to the first node; and
        using the first node's translational and rotational position as discriminators, determining a modified translational and rotational position for the first node such that the relationship of the first node between each of the one or more related nodes is satisfied.

2. The computer program of claim 1, wherein the instructions for modifying the motion data comprise PointAt logic.

3. The computer program of claim 1, wherein the instructions for modifying the motion data comprise locking one segment to the end of another by defining a hold distance.

4. The computer program of claim 1, wherein the instructions for modifying the motion data comprise locking one segment to the end of another by defining one of the segments as a dual pointer object.

5. A method for processing motion data, comprising the steps:
    creating a character motion hierarchy, the character motion hierarchy consisting of a first framework of a plurality of nodes, wherein the position of each one of the plurality of nodes is defined in terms of its angular relation to a coordinate system, and wherein each one of the plurality of nodes is related to one or more of the remaining plurality of nodes by a segment;
    generating motion data, the motion data having an associated motion capture hierarchy, the motion capture hierarchy consisting of a second framework of a plurality of sensor positions, wherein the motion data consists of time-based translation data for each of the plurality of sensor positions;
    assigning the motion data to the character motion hierarchy, such that each one of the plurality of nodes is assigned the time-based translation data for one of the plurality of sensor positions; and
    for a first node of the plurality of nodes, modifying the time-based translational data assigned to the first node according to any segments associated with the node the first node's relationship to one or more of the remaining plurality of nodes and the first node's angular relation to the coordinate system.

6. The method of claim 5, wherein the step of modifying the time-based translational data comprises replacing the time-based translational data with data derived from the time-based translation data of the one or more nodes related to the first node.

7. The method of claim 5, wherein the step of modifying the time-based translational data comprises modifying the time-based translational data according to the data derived from the time-based translation data of the one or more nodes related to the first node.

* * * * *